UNITED STATES PATENT OFFICE.

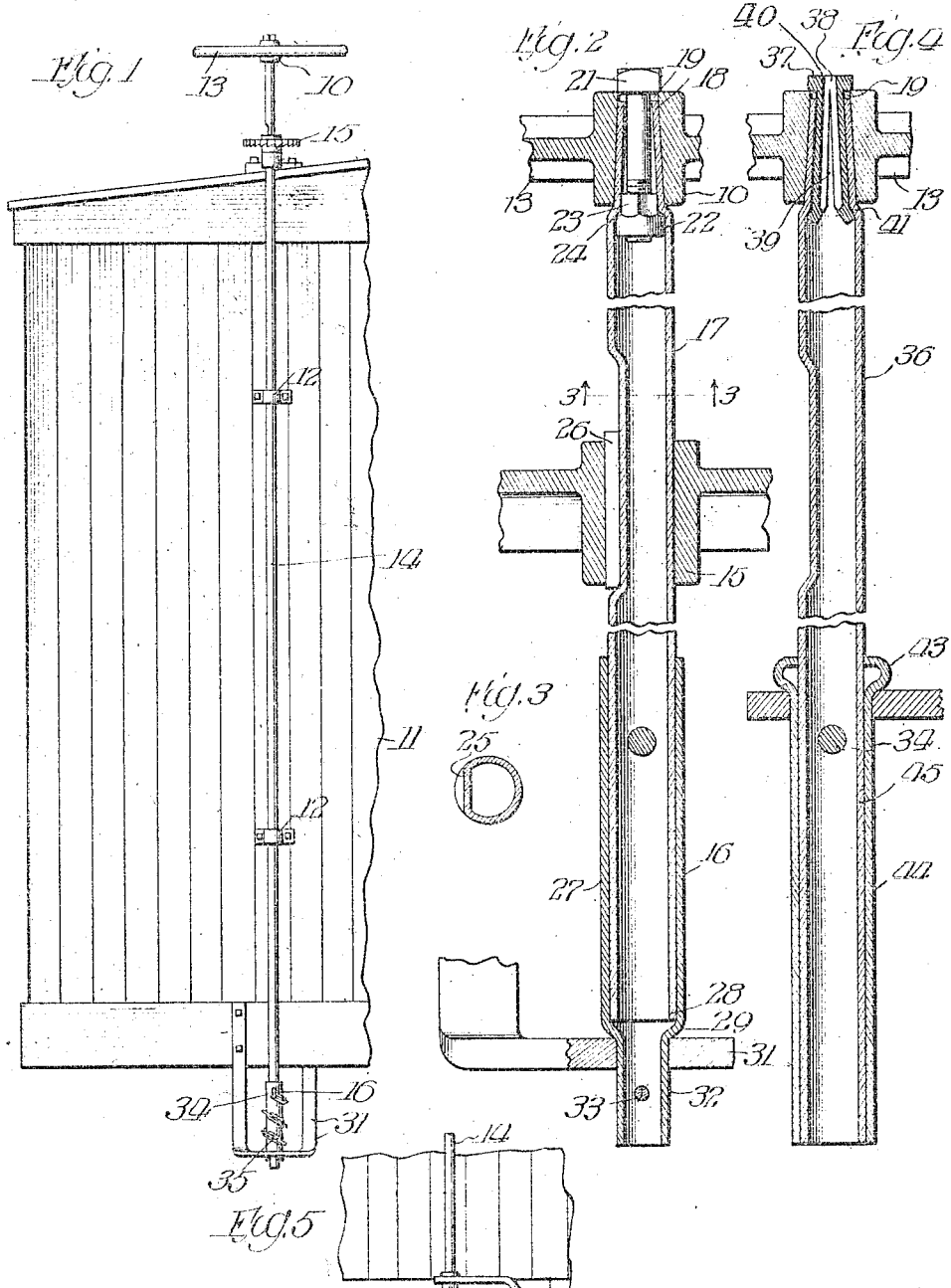

CHARLES A. CARSCADIN AND GEORGE A. WOODMAN, OF CHICAGO, ILLINOIS, ASSIGNORS OF ONE-THIRD TO RAYMOND C. DUDLEY, OF CHICAGO, ILLINOIS.

CAR-BRAKE SHAFT.

1,051,488. Specification of Letters Patent. Patented Jan. 28, 1913.

Application filed April 22, 1912. Serial No. 692,531.

*To all whom it may concern:*

Be it known that we, CHARLES A. CARSCADIN and GEORGE A. WOODMAN, citizens of the United States, residing at Chicago, in the county of Cook and State of Illinois, have invented certain new and useful Improvements in Car-Brake Shafts, as set forth in the following specification.

Our invention relates in general to brake shafts, and more particularly to devices of this character which are used upon railway cars, street cars and the like, and has for one of its principal objects the provision of a brake shaft or stem which will be lighter in weight and cheaper to construct than those heretofore employed.

To this end the invention contemplates the construction of a brake shaft from hollow metallic tubing shaped to receive the various parts of the windlass, and to retain them fixedly in position.

Further objects and advantages of our invention will be apparent as it is better understood from the following description which, taken in connection with the accompanying drawing, illustrates one preferred embodiment thereof.

On the drawings:—Figure 1 discloses a front elevation of a portion of a freight car provided with a brake shaft constructed in pursuance of our invention; Fig. 2 is a vertical central sectional view with parts broken away of the windlass shown in Fig. 1; Fig. 3 is a horizontal sectional view taken on the line 3—3 of Fig. 2; Fig. 4 is a vertical central sectional view with parts broken away disclosing a modified form of the shaft shown in Figs. 1, 2 and 3, and Fig. 5 is a front elevation of the lower end of the shaft disclosed in Fig. 4 showing the engagement between the bottom of the shaft and the brake shaft step when the shaft in Fig. 4 is employed.

For the purpose of illustrating our invention we have shown a brake windlass generally designated as 10 rotatably mounted upon the end of a freight car 11 in suitable shaft bearings 12. This windlass is constituted primarily of the operating member or wheel 13, the shaft 14, the ratchet wheel 15 and the brake spool 16.

The shaft 14 is formed of a hollow tube of suitable metallic material, the upper end of which is shaped to fit snugly within the aperture of the operating wheel 13. This aperture, in accordance with the usual custom, is square or rectangular in horizontal section and is tapered throughout its length as is shown in Figs. 2 and 4, it being understood, however, that the end 18 may be shaped to fit apertures having any desired form without departing from the spirit and scope of the invention.

In the embodiment of the invention shown in Fig. 2, the wheel after being positioned upon the end of the shaft 17 is drawn down thereover and retained in fixed relation thereto by means of a bolt 21, the head of which rests upon the upper surface of the hub of the wheel, and the end of which is secured in threaded engagement with the nut 22, a portion of the said nut being shaped to fit accurately within the shaped end 18 of the tube 17 as at 23, the remaining portion of the nut forming a shoulder bearing against the shoulders 24 formed within the tube where the shaped end joins the main portion of the shaft. Beneath the operating wheel 13 and immediately above the roof of the freight car when the windlass is in operative position, as shown in Fig. 1, one side of the tube 17 is pressed inwardly to provide a bearing surface 25 against which the key 26 is positioned to lock the ratchet wheel 15 to the shaft. The chain spool 16 is formed by fitting the lower end of the shaft 17 within a tubular member 27 where it is secured in suitable manner.

The outer tube 27 is diminished in diameter beneath the end 28 of the tube 17 to provide a shoulder 29 adapted to bear against the brake shaft step 31 in which the end of the shaft 32 is rotatably mounted as is shown in Fig. 2. To retain the shaft in position and to prevent it from being lifted out of the step 31 we provide a split key or cotter-pin 33 of the usual form. Extending through both tubes and secured in position in any suitable manner is provided an eye bolt 34 with which the end of the brake chain 35 is engaged.

In the embodiment of the invention shown in Fig. 4 the tube 36 is shaped at its upper end like the tube 17, and is positioned in the aperture 19 of the operating wheel 13. In this embodiment, however, the wheel is drawn down over the end of the tube and retained in position by means of a split member 37 as is shown in Fig. 4. The member 37 has an enlarged head adapted to bear against the upper surface of the hub of the wheel 13 and is provided with an aperture 38 extending throughout the length of the said member. This member is provided with a plurality of longitudinally disposed slits 39 extending from the end of the member opposite the head 40 and terminating adjacent the said head. After the operating wheel 13 has been positioned upon the end of the tube the member 37 is positioned within the tube having the head 40 bearing against the hub of the operating wheel 13. With the parts in this relation the head of the member 38 is positioned against an unyielding surface and a sharp pointed tool of suitable dimension and shape is introduced into the aperture 38 to spread the ends of the member 37 as is shown in Fig. 4 to engage the shoulder 41 formed between the main portion of the tube 36 and its shaped end.

When a brake shaft step 42 of the type disclosed in Fig. 5 is employed a shoulder 43 is provided at the upper end of the tube 44 forming a chain spool 45 as is shown in Fig. 4. In this form, however, the eye-bolt 34 to which the brake chain is attached is secured through the tubes 36 and 44 beneath the step instead of above it as in the embodiment first described.

It will be manifest from the foregoing description that a slight modification well within the experience and skill of those familiar with the art will permit a brake shaft made in pursuance of our invention to be employed upon street cars and in fact upon any vehicles or machines employing a rotatable brake shaft.

It is obvious also that various minor changes may be made in the form of the parts and their arrangement without departing from the spirit or scope of our invention, or sacrificing any of its advantages, the forms hereinbefore disclosed being merely two preferred embodiments thereof.

We claim:—

1. A shaft for car brakes comprising a hollow tube shaped at its upper end to receive an operating member, and being adapted to be rotatably mounted at a car end, and a second tube fitted upon the lower end of said first-named tube and adapted to have secured thereto an end of a brake chain.

2. A shaft for car brakes comprising a hollow tube shaped at its upper end to receive an operating member and being adapted to be rotatably mounted at a car end, and a second tube fitted upon the lower end of said first-named tube, said latter tube having a peripheral shoulder adapted to rest upon the brake shaft step to support the shaft in position.

3. A shaft for car brakes comprising a hollow tube adapted to be rotatably mounted at a car end and to receive an operating member at its upper end, and a second tube fitted upon the lower end of said first-named tube, and means disposed through both tubes for attaching the brake chain to the shaft.

4. A shaft for car brakes comprising a hollow tube shaped to engage an operating member, said tube being adapted to be rotatably mounted at a car end, and means disposed within the said tube for securing the said operating member in position.

5. A shaft for car brakes comprising a hollow member adapted to be secured to a car end and to engage an operating element at its upper end, and a ratchet wheel mounted on said member, one side of the member being depressed to engage a key locking the ratchet wheel in position.

6. A shaft for car brakes comprising a hollow member adapted to be rotatably mounted at a car end, shaped at its upper end to receive an operating element and having the bottom portion thereof enlarged and adapted to have an end of the brake chain secured thereto.

7. A car brake shaft comprising a hollow member adapted to engage an operating element at one end and having a depression in one side and means disposed within the member for locking the said operating element in position, said means being always retained in the member above the depression in its side.

CHARLES A. CARSCADIN.
GEORGE A. WOODMAN.

Witnesses:
Wm. O. Belt,
M. A. Kiddie.